United States Patent Office 3,363,485
Patented Jan. 16, 1968

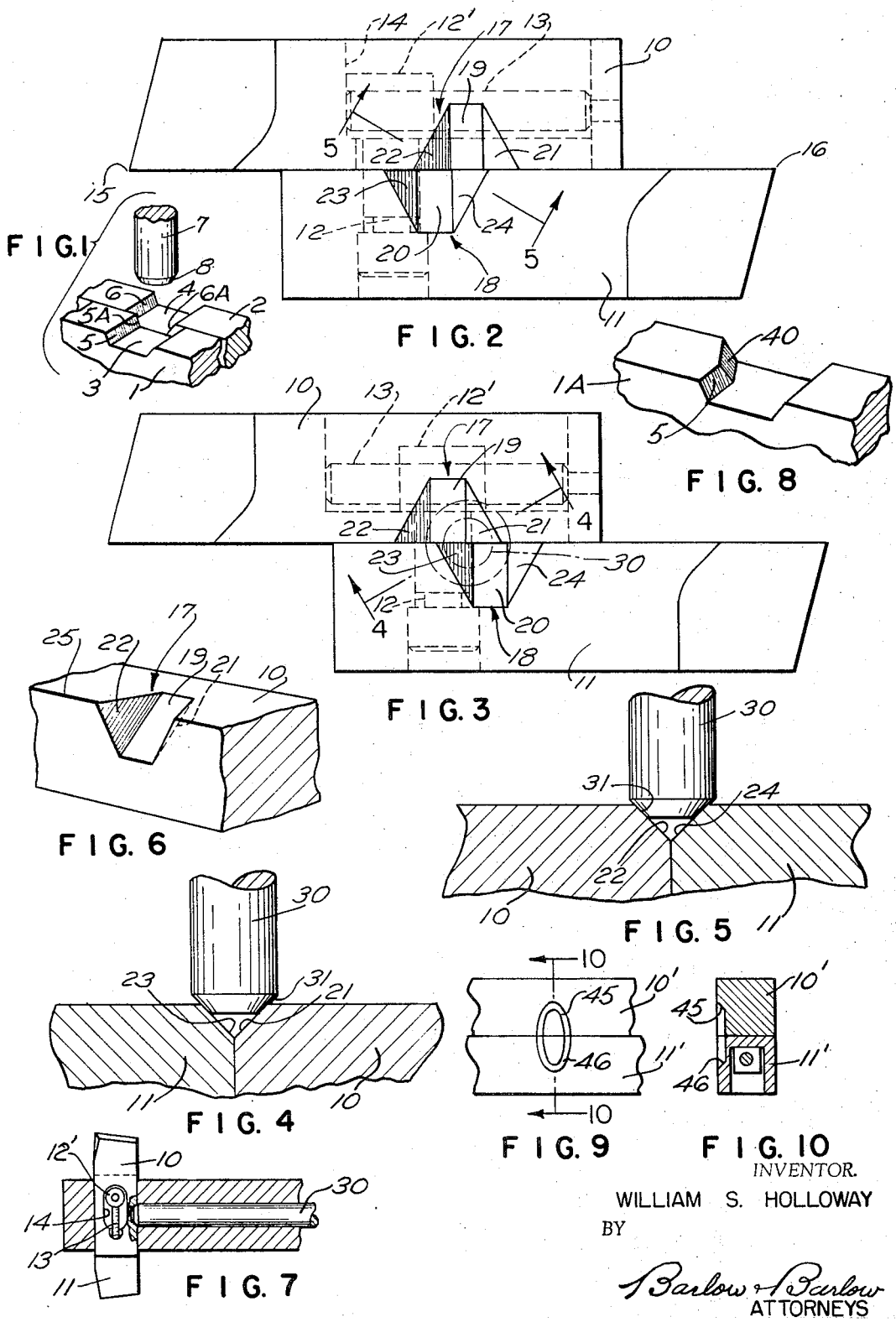

3,363,485
BORING CUTTER NOTCH
William S. Holloway, Cumberland Hill, R.I., assignor to Madison Industries, Inc., a corporation of Rhode Island
Filed Nov. 3, 1966, Ser. No. 591,769
4 Claims. (Cl. 77—58)

This invention relates to boring cutter assemblies which are used with boring bars, and more particularly to the centering notch in the cutter.

Boring bars have assumed a rather standard configuration in that they include a transverse opening to receive the cutter assembly, together with an axial bore intersecting the opening, which bore receives a centering pin. This arrangement is shown, for example, in United States patent specification 3,131,585. The cutter is conventionally centered within the transverse opening by means of the centering pin which is pressed against the cutter and into the notch cut into the cutter blade walls. When the cutter blades are initially furnished by the manufacturer to a customer's specified size, the side walls of the notch in the cutter body are generally in line such as shown, for example, in United States patent specification 2,408,891. When the cutting surfaces become dull and are reground, the relative position of the blades is changed, the blades sliding relative one to the other. It follows that the notch is now misaligned and the centering pin will now rest on the inclined edge of opposite side walls of a notch in each blade, these edges being located at the juncture between the two blade parts. It will be apparent that when a chamfered end of a centering pin is squeezed down onto a sharp edge, as in a roughing cutter application, or alternately the whole cutter assembly moves in the transverse opening in the boring bar as in a reaming application, burrs will develop at the edge by pressure in a roughing cutter and by a peening action in the reaming cutter application. The development of the burr necessitates dressing of the notch from time to time, and it is therefore the principal object of this invention to provide a new form of centering notch in a cutter which will provide a positive land against which the centering pin may bear.

With this and other objects in view, the invention consists of certain novel features of construction as will be more fully described and particularly pointed out in the appended claims.

In the accompanying drawings:

FIG. 1 is a detached fragmental view illustrating the cutter assembly as it existed prior to my invention;

FIGS. 2 and 3 are elevational views of a roughing cutter with the centering notch of my invention, the cutter blades being shown in two different positions;

FIGS. 4 and 5 are sectional views taken on lines 3—3 and 4—4 of FIGS. 2 and 3;

FIG. 6 is a perspective view of the notch in one of the blades;

FIG. 7 is a fragmental view partly in section showing the boring bar and cutter assembly;

FIG. 8 is a fragmental view of a modified form of notch in accordance with the invention;

FIG. 9 is a fragmental top view of another modified form of notch; and

FIG. 10 is a sectional view taken on lines 10—10 of FIGURE 9.

Referring to the drawings and particularly to FIG. 1, there is shown therein in a detached perspective view a cutter assembly having a pair of blades 1 and 2. Formed transversely of the cutter blades 1 and 2 are a pair of notches 3 and 4, respectively, each of the notches having the usual opposed diverging inclined faces such as indicated at 5 and 6. A lock pin which extends through a boring bar, the lock pin being designated by the numeral 7, has a chamfered end 8, and this chamfered end is adapted to engage in the notches 3 and 4. Now when the cutter assembly is in the position such as illustrated in FIG. 1 in the drawings and the notches are misaligned due to the adjustment of the blades 1 and 2, the result is exposing the inclined edges 5A and 6A to the chamfered end 8 of the lock pin 7. It is these inclined edges 5A and 6A which are the edges that will engage the chamfered end 8 since no engagement will be had by the faces 5 or 6 as such. It will be apparent, as briefly explained above, that any movement of the cutter assembly in the usual boring bar will tend to peen or create burrs on the inclined edges 5A and 6A. Further, if the cutter assembly is utilized as a roughing cutter, then the clamping action of the lock pin 7 tightly onto the edges 5A and 6A will create the same result.

In an effort to overcome this undesirable burring or peening action on edges of the notches, I provide a cutter assembly such as illustrated in FIGS. 2 and 3 of the drawings which cutter assembly in and of itself may be of any suitable or desirable construction but is here illustrated purely by way of example as consisting of a pair of blades 10 and 11 that are secured together in adjustable relationship so as to determine the limits of diameter of the cut being formed. In one suitable form of construction, the cutter assembly blades 10 and 11 are clamped together by means of a clamping stud 12 which may be a socket-headed screw, the socket head bearing against a shouldered surface in the blade 11 and being received in threading engagement in a nut 12'. For adjustment purposes of the blades relative to each other, screw means 13 threadingly engage the nut 12', the screw means 13 being retained within a recess 14 in the blade 10. This is similar to the adjustment means shown in my prior Patent No. 3,081,649. Each of the blades 10 and 11 have cutting edges 15 and 16, respectively, and have formed in the side walls thereof centering notches which are generally designated 17 and 18, respectively. Each of the notches is cut into the side wall of the blade a substantial distance, and in the preferred embodiment the notches are shown as being cut at an angle to the side wall of each of the blades so that the bottom of the notches which are designated 19 and 20, respectively, extend on a plane which intersects the plane of the side wall of each of the blades at an obtuse angle and would intersect the plane of the mating surface of each of the blades at an acute angle. On the sides of each of the notches 17 and 18, there are formed diverging faces, there being diverging faces 21, 22 for the notch 17, and diverging faces 23, 24 for the notch 18.

Th orientation of the diverging faces is best described by referring to the drawings and in particular FIGS. 4 and 5 which are sections taken on line 4—4 and 5—5 of FIGS. 2 and 3, which sections are taken substantially through the center of a centering pin such as 30 that has a chamfered end 31. From this view it will be seen that the diverging side faces extend generally in a plane which can be said to be substantially parallel to a plane that is tangent to the chamfered end of the centering pin at the point of contact of the centering pin with the diverging faces. Preferably the plane of the side faces is such that in all adjusted positions between those shown in FIGS. 2 and 3, tangency will be maintained. This point of contact is purposely chosen so as to lie substantially at the positon shown by the section lines in the drawing, although other design angles could be used without departing from the spirit of the invention.

By this particular configuration it will be seen that the chamfered end of the centering pin will contact a face rather than an edge such as the edges 5A and 6A in FIG. 1, and by contacting such a face any peening or burring action that may have occurred in the past is prevented.

Certain other modifications to the basic and preferred concept will, of course, occur to those skilled in the art. For example, as illustrated in FIG. 8, there is shown a typical cutter in which a notch that has formed in a similar fashion to the notches as illustrated in FIG. 1 have been cut. However, these notches have been modified to the extent that one of the normal diverging faces thereof has a corner ground off. For example, referring to FIG. 1 again, the cutter blade 1 and the diverging face 5 normally presented an edge 5A. This edge 5A in the embodiment of FIG. 8 is now another diverging face designated by the numeral 40 which diverging face is oriented in a plane to be normally tangent to the chamfered end of a centering pin, such as either the centering pin 7 or the centering pin 30. In this particular embodiment it is envisioned that the notches will normally be furnished by the manufacturer in aligned position so that adjustment of the blade 1A such as shown in FIG. 8 would be always in a direction which would be to compensate for regrinding thereof. The preferred embodiment, however, encompasses two pair of diverging faces so that no matter which way the cutter is adjusted, that is, whether it be in the position as shown in FIG. 2 of the drawings or in the position that is shown in FIG. 3 of the drawings, there will be a planal surface which would be substantially tangent to the chamfered end of the centering pin 30. If the cutting assembly is furnished in this fashion, it will be apparent to those skilled in the art that considerable more adjustment may be achieved by utilizing this form of notch construction than could be achieved in the past.

For example, there has been disclosed in United States Letters Patent No. 3,131,585 a particular form of notch where the principal object of the notch construction was to achieve a greater degree of adjustment before regrinding of the notch was necessary. A similar result can be achieved by the instant invention since it is possible in this invention to deeply grind the depth of the notch and provide the diverging faces in a fashion where a cutter assembly may be normally furnished with the notches out of alignment such as shown in FIG. 2 of the drawings in which case the centering pin will engage the diverging faces as shown in the sectional view of FIG. 5. When the cutting assembly blades have been reground several times, it will be necessary to readjust the relative position of the cutting blades one to the other and a position such as is illustrated in FIG. 3 will be achieved. When a position such as this is achieved, the relationship of the centering pin 30 to the diverging faces which in this case are the faces 21 and 23 is illustrated in the sectional view of FIG. 4. It will be apparent even at this position that more adjustment can be had until there is no chamfered surface of the centering pin remaining for contact with the diverging faces, at which point either a regrind of the notches must be had or the roughing or reaming tool discarded.

A further modification of the basic concept is illustrated in FIGURES 9 and 10. In this embodiment a notch having elliptical side walls is illustrated. The proportions of the drawing are illustrative only but are intended to convey the general concept of providing opposed inclined wall surfaces 45, 46 on blades 10′ and 11′ which can be generated to provide substantial tangency of surface over the adjustment range of the cutter.

Illustrating the advantages secured by this construction, it has been shown in laboratory experiments that in cutting assemblies which are manufactured for roughing or reaming bores of from two to six inches, that approximately five regrinds of the cutting surface may be had before it becomes necessary to either regrind the notch or to discard the tool. These figures are, of course, applicable to cutters in which the cutting surfaces are rigidly affixed to the cutting blades but would have no direct applicability to a cutting assembly with the so-called throw-away tip construction where a cutting assembly has much more life as the cutting tip which is usually a throw-away carbide tip may be changed many times during the life of the actual cutting assembly itself.

I claim:
1. A boring tool comprising a body structure having a boring cutter received in an opening therein, a centering pin intersecting said opening, a cutter assembly mounted in said opening, said centering pin having a chamfered end, said cutter assembly comprising a pair of cutter blades interfitting with each other along a mating surface and each being provided with a notch in the side wall thereof, diverging faces of said notch, said faces having at least a portion thereof located at the juncture of the side wall and mating surface, said face including a tangency portion thereof which is substantially parallel to a tangent of the chamfered end of said centering pin, each notch having at least one diverging face which is located with respect to said pin substantially 180° from the diverging face of the other notch whereby substantial tangential contact between the centering pin and the cutter assembly may be had.

2. A boring tool as in claim 1 wherein the notches extend across the side walls of each blade and the diverging faces include two planal surfaces intersecting at an obtuse angle.

3. A boring tool as in claim 1 wherein the notches are formed in an ellipse and the diverging faces are elliptical.

4. A boring tool as in claim 1 wherein the notches have bottom walls, said bottom walls being cut at an angle to the mating and side walls of each cutter blade.

No references cited.

GERALD A. DOST, *Primary Examiner.*